United States Patent [19]

Jenkins et al.

[11] Patent Number: 4,939,233

[45] Date of Patent: Jul. 3, 1990

[54] AQUEOUS POLYMER COMPOSITIONS AND METHODS FOR THEIR PREPARATION

[75] Inventors: Waylon L. Jenkins; Kenneth R. Barton, both of Kingsport, Tenn.; Harold L. Jaffe, Millburn, N.J.

[73] Assignee: Eastman Kodak Company, Rochester, N.Y.

[21] Appl. No.: 279,672

[22] Filed: Dec. 5, 1988

[51] Int. Cl.[5] .............................................. C08G 63/02
[52] U.S. Cl. ..................................... 528/272; 528/294; 528/295; 528/302; 528/304; 528/306; 528/308; 528/392; 525/39; 525/437; 428/458; 524/608
[58] Field of Search ............... 528/272, 294, 295, 302, 528/304, 306, 308, 392; 525/39, 437; 428/458; 524/608

[56] References Cited

U.S. PATENT DOCUMENTS

| | | | |
|---|---|---|---|
| 3,708,388 | 1/1973 | Lindemann et al. | 161/247 |
| 4,119,680 | 10/1978 | Vachon | 525/30 |
| 4,300,580 | 11/1981 | O'Neill et al. | 132/7 |
| 4,335,220 | 6/1982 | Coney | 523/414 |

OTHER PUBLICATIONS

U.S. Ser. No. 279,673, filed Dec. 5, 1988, by Jenkins, entitled *"Water-Dispersible Polyester Blends"*.
Paper presented by F. Cuirassier, Ch. H. Baradji and G. Riess, Preparation of Microlatex in the Presence of Functionalized Polyesters as Surfactants, at the Aug. 1987, National ACS Meeting.

*Primary Examiner*—John Kight
*Assistant Examiner*—S. Acquah
*Attorney, Agent, or Firm*—John F. Stevens; William P. Heath, Jr.

[57] ABSTRACT

An aqueous dispersion comprising a polyester having repeat units from at least one difunctional sulfomonomer containing at least one metal sulfonate group attached to an aromatic nucleus wherein the functional groups are carboxyl or hydroxyl, and a polymer having a majority of repeat units from vinyl acetate, wherein this polymer is formed from monomers polymerized in an aqueous dispersion of said polyesters.

16 Claims, No Drawings

AQUEOUS POLYMER COMPOSITIONS AND METHODS FOR THEIR PREPARATION

TECHNICAL FIELD

This invention relates to aqueous polymer compositions comprising a water-dispersible polyester and a polymer or copolymer of vinyl acetate, and the method of preparing such compositions. These compositions are high in solids content and are especially useful as adhesives and other coatings.

BACKGROUND OF THE INVENTION

Various polyester compositions and aqueous dispersions thereof are generally known in the art. Aqueous polyester compositions used in the present invention are normally limited to a solids content of no more than about 30%. In certain applications, it would be desirable to increase the solids content to relatively high levels, say 65%.

Polyester blends are known and are generally prepared by melt blending. However, intimate blends such as provided by the present invention are generally difficult to prepare because of the high melt viscosities of the polyesters involved and the incompatibility of most polyesters with other polymers. Additionally, intimate blends are very difficult to disperse in water if either of the polymers is not water dispersible or water soluble.

Blends can also be prepared in solution followed by removal of solvent, but this approach also has inherent problems. For example, a mutual solvent or solvent mixture must be found that maintains compatibility as the polymer concentration increases during solvent removal.

The formation of one polymer in the presence of another polymer is also a known concept. For example, "core/shell" polymer systems are known in which a crosslinked "core" is first polymerized by emulsion polymerization, followed by addition of a second monomer which is polymerized to form a "shell."

Another example in which an addition polymer is formed in the presence of another polymer is the use of nonionic water-soluble polymers including poly(vinyl alcohol), hydroxyethylcellulose, gum acacia, polyacrylic acid, and various other water-soluble polymers as protective colloids for polymerization of various monomers.

The use of poly(vinyl alcohol) for vinyl acetate polymers and copolymers has been particularly important commercially as illustrated in U.S. Pat. No. 3,708,388.

U.S. Pat. No. 4,335,220 describes the use of water-dispersible polyesters as sequestering agents for water-immiscible solids and liquids. The material to be dispersed must be a hydrophobic deformable organic substance.

U.S. Pat. No. 4,119,680 (Vachon) describes grafted water-dispersible copolyesters useful as binders and finishes for polyester-containing fabrics. The polyesters contain $\alpha,\beta$-unsaturated dicarboxylic acids to provide sites for grafting. The graft copolymers are prepared by polymerization of vinyl or acrylic monomers in aqueous dispersions of these polyesters.

Water-soluble unsaturated polyester salts have been used to emulsify styrene to make polymers (Y. Ch. Chu and W. Funke, Angew. Makromol. Chem., 1982, No. 103, p. 187, 203; W. Funke et al., Makromol. Chem., 180, 1979, p. 2797; M. Narkis, J. Appl. Polym. Sci., 23, 1979, p. 2043; H. Baumann, B. Joos and W. Funke, Macromol. Chem. Phys., 1986, Vol. 187, p. 2933). The work directed by Funke concerns polyesters which are carboxyl terminated. The emulsifying properties are only observed if the carboxyl groups are completely dissociated, which requires a weakly alkaline environment (pH ca. 8.5). Work has been done with both saturated and unsaturated polyesters. These are low molecular weight polyesters with number average molecular weights reported from 1,000 to 3,000. Funke reports that at very short chain lengths the polyesters do not emulsify at all, and at higher molecular weights the polyesters are water insoluble even when the carboxyl groups are neutralized.

At the August 1987 national ACS meeting a paper was presented by F. Cuirassier, Ch. H. Baradji and G. Riess on the preparation of microlatices in the presence of functionalized polyesters. The polyesters used were carboxy-terminated with number average molecular weights in the range of 1,000 to 4,000. Styrene and acrylic monomers were polymerized to form microemulsions. These polyesters appear to be similar to those used by Funke and therefore have similar limitations.

There exists a need for polyvinyl acetate latices that provide better adhesion properties for various coatings such as faster bonding, better hold-out, i.e.. not easily absorbed into the substrate, etc.

One object of the present invention is to provide latices of polyvinyl acetate and copolymers thereof, useful as adhesives, in paper coatings and in inks that exhibit:

a. faster setting or bonding speeds.
b. high solids level (up to 65%).
c. improved "hold out"; and
d. high gloss.

Another object is to provide latices of polyvinyl acetate and copolymers thereof that are free of surfactants or wetting agents.

The present invention further provides substrates adhered together by the dried residue of the aqueous dispersion of the present invention.

DESCRIPTION OF THE INVENTION

According to the present invention there are provided high solids aqueous polymer compositions (sometimes referred to herein as "blends") comprising about 5–50 percent by weight of a water dispersible polyester, the polyester having an inherent viscosity (I.V.) of at least 0.1 and having repeat units from (a) at least one dicarboxylic acid,
(b) from about 4 to about 25 mole percent, based on the total of all acid and hydroxyl monomers being equal to 200 mole percent, of at least one difunctional sulfomonomer containing at least one metal sulfonate group attached to an aromatic nucleus wherein the functional groups are hydroxyl or carboxyl, and
(c) at least one glycol, and about 95–50% by weight of a polymer or copolymer of vinyl acetate having repeat units from about 50 to 100 weight percent vinyl acetate and said polymer or copolymer having been polymerized in an aqueous dispersion of said polyester.

Preferably the glycol of (c) above contains some poly(ethylene glycol) to aid in its water dispersibility. When some poly(ethylene glycol) is used, the content of the sulfomonomer can be lower, which aids in flexibility of formulating the polyester.

The water dispersibility of the polyester is related to the weight percent of poly(ethylene glycol) and mole percent of sulfomonomer. Therefore, if the content of either is relatively low, the other should be relatively high to maintain adequate dispersibility.

The poly(ethylene glycol) need not be present in the initial reaction charge, because poly(ethylene glycol) may form in situ from decomposition products and be incorporated into the polyester chain. It is well known, for example, that diethylene glycol is formed in situ in such reactions.

It has been found that the respective concentrations of the polymeric components may be broadly about 5–50 weight percent polyester and about 95–50 weight percent polymer or copolymer of vinyl acetate. However, the concentration preferred for uses such as adhesives is about 5–25 weight percent polyester and about 95–75 weight percent polymer or copolymer of vinyl acetate.

Also, according to the present invention, a method of preparing an aqueous polymer dispersion is provided which comprises
(I) forming an aqueous dispersion having
(1) about 5% to about 35% of a polyester having an I.V. of at least 0.1 and having repeat units from
  (a) at least one dicarboxylic acid,
  (b) from about 4 to about 25 mole percent, based on the total of all acid and hydroxyl monomers being equal to 200 mole percent, of at least one difunctional sulfomonomer containing at least one metal sulfonate group attached to an aromatic nucleus wherein the functional groups are hydroxyl or carboxyl, and
  (c) at least one glycol,
and
(2) at least one vinyl monomer of which about 50 to 100 weight percent is vinyl acetate,
and
(II) polymerizing said vinyl monomer in said aqueous dispersion,
to thereby obtain an aqueous dispersion of a blend of polymers with a total solids content of up to about 65%.

In the preferred form of the present invention, the polyester contains repeating units of a poly(ethylene glycol) of the formula $H-(OCH_2-CH_2)_n-OH$ wherein n is an integer of 2 to 500. The values of n and the mole percent of poly(ethylene glycol) in the polyester, if used, are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol is an important consideration because the water dissipatability of the copolyester decreases as the weight percent poly(ethylene glycol) in the copolyester decreases. For example, if the weight percent of poly(ethylene glycol) is too low, the water dissipatibility of the copolyester may be inadequate. Furthermore, the weight percent of poly(ethyene glycol) is preferably adjusted such that it is inversely proportional to the mole percent of the difunctional sulfomonomer because the water dissipatibility of the copolyester is a function of both the mole percent sulfomonomer and the weight percent polyethylene glycol.

Examples of suitable poly(ethylene glycols) include relatively high molecular weight polyethylene glycols, some of which are available commercially under the designation "Carbowax," a product of Union Carbide. Diethylene glycol is also especially suitable.

Other useful glycols for preparing copolyesters may consist of aliphatic, alicyclic, and aralkyl glycols. Examples of these glycols include ethylene glycol; propylene glycol; 1,3-propanediol; 2,4-dimethyl-2-ethylhexane 1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; and p-xylylenediol.

The dicarboxylic acid component of the polyester are selected from aliphatic dicarboxylic acids, alicyclic dicarboxylic acids, aromatic dicarboxylic acids, or mixtures of two or more of these acids. Examples of such dicarboxylic acids include succinic; glutaric; adipic; azelaic; sebacic; 1,4-cyclohexanedicarboxylic; phthalic; terephthalic and isophthalic. If terephthalic acid is used as the carboxylic acid component of the polyester, superior results are achieved when at least 5 mole percent of one of the other acids is also used.

It should be understood that use of the corresponding acid anhydrides, esters, and acid chlorides of these acids is included in the term "dicarboxylic acid."

The difunctional sulfomonomer component of the polyester may advantageously be a dicarboxylic acid or an ester thereof containing a metal sulfonate group, a glycol containing a metal sulfonate groups or a hydroxy acid containing metal sulfonate group. The metal ion of the sulfonate salt may be $Na^+$, $Li^+$, $K^+$ and the like. When a monovalent alkali metal ion is used the resulting polyesters are less readily dissipated by cold water and more readily dissipated by hot water. When a divalent or a trivalent metal ion is used the resulting polyesters are not ordinarily easily dissipated by cold water but are more readily dissipated in hot water. It is possible to prepare the polyester using, for example, a sodium sulfonate salt and later by ion-exchange replace this ion with a different ion, and thus alter the characteristics of the polymer. The difunctional monomer component may also be referred to as a difunctional sulfomonomer and is further described hereinbelow.

Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters.

Particularly superior results are achieved when the difunctional sulfomonomer component is 5-sodiosulfoisophthalic acid or its esters, and the glycol is a mixture of ethylene glycol or 1,4-cyclohexanedimethanol with diethylene glycol.

If desired, the vinyl acetate may be mixed with additional monomers which are copolymerizable with vinyl acetate. The comonomers may therefore be present in amounts from 0 to about 50 weight percent. Polymer blends in which the second polymer has a relatively high percentage of vinyl acetate are preferred. Particularly preferred polymer blends are those in which the second polymer contains from 75 percent to 100 percent vinyl acetate and from 0 to about 25 percent comonomers.

One class of suitable comonomers are acrylic and methacrylic esters. Acrylic and methacrylic acid esters having from 1 to about 20 carbon atoms in the alcohol moiety are commercially available or can be easily prepared by known esterification processes. Preferred esters are the methyl, ethyl, butyl, 2-ethylhexyl and lauryl esters.

The acrylic and methacrylic acid esters may contain additional functional groups of the alcohol moiety, such as for example, hydroxyl, amine, halogen, ester, carboxylic acid, amide, nitrile and alkyl groups. Functionalized monomers such as hydroxyethylmethacrylate and blocked isocyanate acrylates and methacrylates may also be used to provide crosslinking sites for the preparation of curable systems.

Mixtures of vinyl acetate with olefin monomers, such as, for example, ethylene also provide modified polyesters having particularly useful properties. The relative amounts of vinyl acetate and olefin monomers are varied to provide the desired properties in the modified polyester, and generally range from about 60:40 to about 95:5, preferably 75:25 to 90:10, respectively, by weight.

Also particularly useful as comonomers are lower alkyl diesters of unsaturated dicarboxylic acids. For example, the $C_{1-4}$ diesters of maleic and fumaric acids, e.g., dibutyl maleate, may be used in copolymers with vinyl acetate.

Other useful comonomers include acrylonitrile, acrylic acid, maleic anhydride, fumaric acid, methacrylic acid, acetoacetoxyethyl methacrylate and the corresponding acrylate, and halogenated vinyl monomers such as vinyl chloride and vinylidene chloride. These monomers may be used individually or may be used as mixtures to provide the desired properties. The preferred ratios of the various monomers can be readily determined by one skilled in the art and are dependent upon the particular application and desired properties of the water-dispersible polyester polyester blend adhesive.

The compositions of the present invention are prepared in aqueous dispersions. The monomers are generally added to an aqueous dispersion of the water-dispersible polyester and polymerized by free radical initiation in conventional emulsion or suspension polymerization processes. The preferred ratio of polyester to monomer in the dispersion prior to polymerization will vary widely and depends on the intended application. The blend compositions of the present invention, on a weight basis of solids, contain about 5 percent to about 50 percent polyester and about 95 percent to about 50 percent polymer or copolymer of vinyl acetate. When all of the vinyl monomer reacts, as would be typical, the percent monomer to be polymerized in the dispersion would be the same weight percent.

The polymer compositions of the present invention are believed to have a "core/shell" morphology. However, in contrast to acrylic core/shell polymers, the core is formed in the shell, rather than the shell being formed around the core.

The water-dispersible modified polyesters of the present invention are distinguishable from the graft copolymers disclosed in U.S. Pat. No. 4,119,680 in which the polyesters contain a $\alpha,\beta$-unsaturated dicarboxylic acids as a means of providing grafting sites. The compositions of U.S. Pat. No. 4,119,680 are graft polymers whereas in the present invention no grafting is expected.

The polymerization can be initiated by a water-soluble free radical initiator known in the art such as sodium persulfate or by an oil-soluble initiator such as benzoyl peroxide. Other useful initiators include redox initiators such as sodium persulfate/sodium metabisulfite, and sodium formaldehyde sulfoxylate/Fe/hydrogen peroxide.

The sulfonate-group containing polyesters which are used in the present invention typically become very viscous at concentrations above the 30 percent total solids. Thus, the reaction typically is begun with a polyester dispersion that is about 30 percent total solids or less. However, the water-dispersible polyester dispersions which are prepared by the process of the present invention can be prepared at final total solids levels up to about 45 percent to 65 percent. A total solids content of about 45 percent to 55 percent is preferred. The increase in solids level is achieved during polymerization by controlling the amount of water, if any, which is added along with the monomer. By decreasing the amount of water added during the polymerization, increased total solids contents up to about 50 percent to 65 percent are possible. This increase in the solids level offers significant benefits for the use of the water-dispersible polyesters of the present invention.

In a preferred embodiment, the sulfonate group-containing polyester is prepared, generally by melt polymerization, and an aqueous dispersion containing about 5-35 weight %, preferably from about 10 percent to 30 percent total solids, is prepared from the polyester directly. A mixture of one or more monomers and the polymerization initiators may then be added to the aqueous dispersion of the polyester and polymerization initiated to produce an aqueous dispersion. The aqueous dispersion so produced can be prepared with total solids contents from about 10 percent to about 65 percent.

The aqueous dispersion of polymers prepared in this manner may be used directly as paper adhesives and coatings. Viscosity control agents, colorants, dyes, stabilizers, etc., may be added to the aqueous dispersions to prepare specific adhesives and coatings.

The total solids content of the aqueous dispersion is controlled by the relative amounts of polymers which are used in the polymerization reaction and by the amount of water added during polymerization. As noted above, dispersions of sulfonate group-containing polymers can practically be prepared only at total solids contents up to about 30 percent. Above 30 percent, these dispersions become highly viscous and difficult to process. Higher total solids contents can be obtained by increasing the amount of monomer and decreasing the amount of polyester which are used in the polymerization reaction. For example, a ratio of polyester/monomer of 50/50 produces a satisfactory dispersion having a total solids content of about 40 percent to 45 percent when using vinyl acetate as the monomer. If the ratio of polyester/monomer is changed to about 5/95, respectively, a total solids content of about 55 percent to 60 percent is obtainable. Accordingly, to obtain aqueous dispersions having higher total solids contents, the polymerization reaction should be conducted with lower polyester/monomer ratios.

The specific amounts of polyester and vinyl polymer can be chosen by one skilled in the art depending on the specific monomers, the desired total solids content and the application for which the aqueous dispersion is intended.

The dispersions according to this invention may be used by applying them as a coating to a substrate such as paper followed by drying to leave a residue of solids in the form of a coating. Alternately, a second substrate can be applied prior to drying to form a bond between the substrates.

In the examples which follow, Brookfield viscosity data and a description of film appearance are given in Table 1, and set time, drying times, and holdout are given in Table 2. Examples 1-11 are in accordance with this invention and show the improved results obtained. Examples 12 and 13 are control examples using a vinyl acetate/ethylene copolymer and a vinyl acetate homopolymer, respectively, both stabilized with polyvinyl alcohol as opposed to the polyesters used in accordance with this invention.

Other features of the invention will become apparent in the course of the following descriptions of exemplary embodiments which are given for illustration of the invention and are not intended to be limiting thereof.

EXAMPLES

EXAMPLE 1

(20:80 Polyester: Polyvinyl Acetate, 65% Solids)

217 g of an aqueous 30 percent solids dispersion of a water-dispersible polyester was heated to 60° C. in a 1-liter resin kettle. The polyester is prepared from 89 mole percent isophthalic acid, 11 mole percent 5-sodiosulfoisophthalic acid, and diethylene glycol. It has a Tg of 29° C. and an inherent viscosity (I.V.) of 0.43. $Na_2S_2O_8$ (1.46 g) is then added as a solution in 22 g of water. Vinyl acetate (260 g) is next added over a period of approximately 5 hours. The product following polymerization of the vinyl acetate appears as a white, viscous dispersion. Dilute $NH_3$ is added to raise the pH to 5.5.

EXAMPLE 2

(20:80 Polyester: Polyvinyl Acetate, 60% Solids)

200 g of an aqueous 30 percent solids dispersion of a water-dispersible polyester is heated to 60° C. in a 1-liter resin kettle. The polyester is prepared from 89 mole percent isophthalic acid, 11 mole percent 5-sodiosulfoisophthalic acid, and diethylene glycol and had a Tg of 29° C. and an I.V. of 0.43. $Na_2S_2O_8$ (1.35 g) is added as a solution in 58 g of water and vinyl acetate 240 g) is added over a period of approximately 4 hours. The product, following polymerization of the vinyl acetate appears as a white, moderately viscous dispersion and the pH is measured to be 4.7. Dilute $NH_3$ is then added to raise the pH to 5.5.

EXAMPLE 3

(20:80 Polyester: Polyvinyl Acetate, 60% Solids)

240 g of an aqueous 25 percent solids dispersion of a water-dispersible polyester is heated to 60° C. in a 1-liter resin kettle. The polyester is prepared from 89 mole percent isophthalic acid, 11 mole percent 5-sodiosulfoisophthalic acid, 78 mole percent diethylene glycol and 22 mole cyclohexanedimethanol and had a Tg of 38° C. and an I.V. of 0.36. $Na_2S_2O_8$ (1 35 g) is added as a solution in 19 g of water followed by addition of vinyl acetate (240 g) over a period of approximately 5 hours. The product following polymerization of the vinyl acetate is a white, moderately viscous dispersion. The pH is measured to be 4.3. Dilute $NH_3$ was added to raise the pH to 5.5.

EXAMPLE 4

(20:80 Polyester: Polyvinyl Acetate, 55% Solids)

183 g of an aqueous 30 percent solids dispersion of a water-dispersible polyester is heated to 60° C. in a 1-liter resin kettle. The polyester is prepared from 89 mole percent isophthalic acid, 11 mole percent 5-sodiosulfoisophthalic acid, and diethylene glycol and has a Tg of 29° C. and an I.V. of 0.43. $Na_2S_2O_8$ (1.35 g) is added as a solution in 95 g of water. Vinyl acetate (220 g) is then added over a period of approximately 4 hours. The product appears as a white, moderately viscous dispersion and the pH was measured to be 4.5. Dilute $NH_3$ is added to raise the pH to 5.5.

EXAMPLE 5

(20:80 Polyester: Polyvinyl Acetate. 55% Solids)

220 g of an aqueous 25 percent solids dispersion of a water-dispersible polyester is heated to 60° C. in a 1-liter resin kettle. The polyester is prepared from 89 mole percent isophthalic acid. 11 mole percent 5-sodiosulfoisophthalic acid, 78 mole percent diethylene glycol and 22 mole percent cyclohexanedimethanol and has a Tg of 38° C. and an I.V. of 0.36. $Na_2S_2O_8$ (1.35 g) is added as a solution in 59 g of water followed by addition of vinyl acetate (220 g) over a period of approximately 5 hours. The product following polymerization of the vinyl acetate appears as a white, moderately viscous dispersion with a pH of 4.1. Dilute $NH_3$ is added to raise the pH to 5.5.

EXAMPLE 6

(20:80 Polyester: Polyvinyl Acetate, 50% Solids)

167 g of an aqueous 30 percent solids dispersion of a water-dispersible polyester are heated to 60° C. in a 1-liter resin kettle. The polyester is prepared from 89 mole percent isophthalic acid, 11 mole percent 5-sodiosulfoisophthalic acid, and diethylene glycol and has a Tg of 29° C. and an I.V. of 0.43. $Na_2S_2O_8$ (1 g) is added as a solution in 132 g of water. Vinyl acetate (200 g) is added over a period of approximately 4 hours. The product following polymerization of the vinyl acetate appears as a white, moderately viscous dispersion and has a pH of 4.5. Dilute NH is added to raise the pH to 5.5.

EXAMPLE 7

(20:80 Polyester: Polyvinyl Acetate, 50% Solids)

200 g of an aqueous 25 percent solids dispersion of a water-dispersible polyester is heated to 60° C. in a 1-liter resin kettle. The polyester is prepared from 89 mole percent isophthalic acid, 11 mole percent 5-sodiosulfoisophthalic acid, 75 mole percent diethylene glycol and 22 mole percent cyclohexanedimethanol and has a Tg of 38° C. and an I.V. of 0.36. $Na_2S_2O_8$ (1 g) is added as a solution in 99 g of water. Vinyl acetate 200 g) is added over a period of approximately 4 hours. The product following polymerization of the vinyl acetate appears as a white, moderately viscous dispersion and had a pH of 3.9. Dilute NH₃ is added to raise the pH to 5.5.

EXAMPLE 8

(15:85 Polyester: Polyvinyl Acetate, 60% Solids)

150 g of an aqueous 30 percent solids dispersion of a water-dispersible polyester is heated to 60° C. in a 1-liter resin kettle. The polyester is prepared from 89 mole percent isophthalic acid, 11 mole percent 5-sodiosulfoisophthalic acid, and diethylene glycol and had a Tg of 29° C. and an I.V. of 0.43. Na₂S₂O₈ (1.3 g) is added as a solution of 94 g of water followed by addition of vinyl acetate (255 g) over a period of approximately 4 hours. The product following polymerization of the vinyl acetate appears as a white, moderately viscous dispersion. The pH is measured to be 4.6. Dilute NH₃ is added to raise the pH to 5.5.

EXAMPLE 9

(15:85 Polyester: Polyvinyl Acetate, 60% Solids)

180 g of an aqueous 25 percent solids dispersion of a water-dispersible polyester is heated to 60° C. in a 1-liter resin kettle. The polyester is prepared from 89 mole percent isophthalic acid, 11 mole percent 5-sodiosulfoisophthalic acid, 78 mole percent diethylene glycol and 22 mole percent cyclohexanedimethanol and has a Tg of 38° C. and an I.V. of 0.36. Na₂S₂O₈ (1.3 g) is added as a solution in 64 g of water. Vinyl acetate (255 g) is then added over a period of approximately 4 hours. The product following polymerization of the vinyl acetate appears as a white, moderately viscous dispersion. The pH is measured to be 4.2. Dilute NH₃ is added to raise the pH to 5.5.

EXAMPLE 10

(10:90 Polyester: Vinyl Acetate, 50% Solids)

100 g of an aqueous 30 percent solids dispersion of a water-dispersible polyester is heated to 60° C. in a 1-liter resin kettle. The polyester is prepared from 89 mole percent isophthalic acid, 11 mole percent 5-sodiosulfoisophthalic acid, and diethylene glycol. It has a Tg of 29° C. and an I.V. of 0.43. Na₂S₂O₈ (1.3 g) is added as a solution in 230 g of water. Vinyl acetate (270 g) is added over a period of approximately 4 hours. The product following polymerization of the vinyl acetate appears as a white, low viscosity dispersion. The pH is measured to be 4.6. Dilute NH₃ is added to raise the pH to 5.5.

EXAMPLE 11

(20:80 Polyester: (Vinyl Acetate/Dibutylmaleate Copolymer (75/25) 55% Solids)

200 g of an aqueous 30 percent solids dispersion of a water-dispersible polyester is heated to 60° C. in a 1-liter resin kettle. The polyester is prepared from 89 mole percent isophthalic acid, 11 mole percent 5-sodiosulfoisophthalic acid, and diethylene glycol. It has a Tg of 29° C. and an I.V. of 0.43. Na₂S₂O₈ (1.3 g) is added as a solution in 105 g of water. A mixture of vinyl acetate (180 g) and dibutyl maleate (60 g) is added over a period of approximately 4 hours. The product following polymerization of the vinyl acetate appears to be white, medium viscosity dispersion. The pH is measured to be 4.6. Dilute NH is added to raise the pH to 5.5.

EXAMPLE 12

(Control)

In this example, vinyl acetate-ethylene copolymer latex having 55% solids is stabilized with polyvinyl alcohol.

EXAMPLE 13

(Control)

In this example, solid polyvinyl acetate homopolymer emulsion having 55% solids is stabilized with polyvinyl alcohol.

TABLE 1
Brookfield Viscosities and Appearances of Cast Films

| Ex. | % Polyester Based on Solids | % Solids | Viscometer RPM | Viscosity | Film Appearance |
|---|---|---|---|---|---|
| 1 | 20 | 65 | 5 | 22,400 | Hazy, glossy, little flowout |
|   |    |    | 10 | 14,000 | |
|   |    |    | 20 | 8,800 | |
|   |    |    | 50 | 4,560 | |
| 2 | 20 | 60 | 5 | 10,000 | Transparent, glossy, good flowout |
|   |    |    | 10 | 6,200 | |
|   |    |    | 20 | 3,900 | |
|   |    |    | 50 | 2,160 | |
| 3 | 20 | 60 | 5 | 14,000 | Transparent, glossy, good flowout |
|   |    |    | 10 | 8,400 | |
|   |    |    | 20 | 5,200 | |
|   |    |    | 50 | 2,880 | |
| 4 | 20 | 55 | 5 | 2,000 | Transparent, glossy, excellent flowout |
|   |    |    | 10 | 1,560 | |
|   |    |    | 20 | 1,100 | |
|   |    |    | 50 | 672 | |
|   |    |    | 100 | 440 | |
| 5 | 20 | 55 | 5 | 2,000 | Transparent, glossy, excellent flowout |
|   |    |    | 10 | 1,440 | |
|   |    |    | 20 | 980 | |
|   |    |    | 50 | 584 | |
|   |    |    | 100 | 388 | |
| 6 | 20 | 50 | 10 | 80 | Transparent, glossy, excellent flowout |
|   |    |    | 20 | 180 | |
|   |    |    | 50 | 168 | |
|   |    |    | 100 | 160 | |
| 7 | 20 | 50 | 10 | 80 | Transparent, glossy, excellent flowout |
|   |    |    | 20 | 120 | |
|   |    |    | 50 | 120 | |
|   |    |    | 100 | 120 | |
| 8 | 15 | 60 | 2.5 | 9,760 | Transparent, glossy, good flowout |
|   |    |    | 5 | 6,080 | |
|   |    |    | 10 | 3,800 | |
|   |    |    | 20 | 2,400 | |
|   |    |    | 50 | 1,336 | |
| 9 | 15 | 60 | 1 | 8,400 | Transparent, glossy, good flowout |
|   |    |    | 2.5 | 4,800 | |
|   |    |    | 5 | 3,200 | |
|   |    |    | 10 | 2,040 | |
|   |    |    | 20 | 1,360 | |
|   |    |    | 50 | 800 | |
| 10 | 10 | 50 | 20 | 320 | Transparent, glossy, good flowout |
|    |    |    | 50 | 320 | |
|    |    |    | 100 | 264 | |
| 11 | 20 | 55 | 100 | 50 | Transparent, glossy, good flowout |
| 12 | 0 | 55 | 20 | 2125 | Transparent |
|    |   |    | 50 | 1600 | |
| 13 | 0 | 15 | 20 | 3300 | hazy, white |

TABLE 1-continued

Brookfield Viscosities and Appearances of Cast Films

| Ex. | % Polyester Based on Solids | % Solids | Brookfield Viscosity Viscometer RPM | Viscosity | Film Appearance |
|---|---|---|---|---|---|
|  |  |  | 50 | 3000 | good flowout |

Notes:
Brookfield viscosities are measured using a Model RV viscometer with a Number 5 spindle.
Films are prepared using a Number 30 wire-wound coating rod and are cast onto a MYLAR polyester film.

TABLE 2

Set Times and Drying Times

| | Set[b] Time (Seconds) | Drying Time,[c] Copier Paper (Seconds) | Drying Time,[c] Kraft Paper (Seconds) | Holdout[d] |
|---|---|---|---|---|
| Example 1 | (Too fast to test) | 10 | 10 | Excellent |
| Example 2 | (Too fast to test) | 15 | 10 | Excellent |
| Example 3 | (Too fast to test) | 10 | 5 | Excellent |
| Example 4 | 6 | 60 | 20 | Excellent |
| Example 5 | 6 | 45 | 15 | Excellent |
| Example 6 | 3 | 40 | 30 | Excellent |
| Example 7 | 3 | 15 | 25 | Excellent |
| Example 8 | (Too fast to test) | 10 | 10 | Excellent |
| Example 9 | (Too fast to test) | 10 | 10 | Excellent |
| Example 10 | (Too fast to test) | 15 | 15 | Excellent |
| Example 11 | (Too fast to test) | 15 | 15 | Excellent |
| Example 12 | 6 | 180 | 45 | Fair |
| Example 13 | 6 | 90 | 75 | Poor |

[a]Relative humidity is 40%.
[b]Set Time is determined as time which 50% or more of the bonding area exhibited fiber tear. Bonds are prepared by applying a thin film of adhesive using a No. 30 wire-wound coating rod onto a piece of copier paper, applying a second piece of copier paper, and rolling over the bond area to ensure good contact. The clock is started as soon as the rolling is complete.
[c]Drying time is measured by applying a thin film of adhesive onto the specified substrate (copier paper or Kraft paper) using a No. 30 wire-wound coating rod and starting the clock. The drying time is taken as the time at which a piece of tissue paper no longer sticks to the adhesive after lightly touching the surface.
[d]Holdout is the extent to which the film remains on the surface rather than adsorbing into the paper. The comments reflect the observations of the results of the drying time experiments.

Inherent viscosity (I.V. is measured at 25° C. using 0.50 gram of polymer per 100 mL of a solvent consisting of 60% by weight phenol and 40% by weight tetrachloroethane.

Unless otherwise specified, all parts, percentages, ratios. etc., are by weight.

It should be understood that the term "water-dispersible" is intended to include substances which are, to some extent, water-soluble.

Obviously, numerous modifications and variations of the present invention are possible in the light of the above teachings. It is therefore to be understood that within the scope of the appended claims, the invention may be practiced otherwise than as specifically described herein.

We claim:

1. An aqueous dispersion comprising a polyester (A) consisting essentially of repeat units from
    (a) at least one difunctional aromatic, saturated aliphatic or saturated alicyclic dicarboxylic acid;
    (b) from about 4 to about 25 mole percent, based on a total of all acid and hydroxyl monomer being equal to 200 mole percent, of at least one difunctional sulfomonomer containing at least one metal sulfonate-group attached to an aromatic nucleus wherein the functional groups are hydroxyl or carboxyl; and
    (c) at least one glycol; and
a polymer (B) having repeat units from about 50 to 100 weight percent vinyl acetate, said aqueous dispersion having been prepared by polymerizing monomers to form said polymer (B) in an aqueous dispersion of said polyester (A), and said aqueous dispersion containing about 50-95% of said polymer (B) and about 50-5% of said polyester (A) both said percentages being based on the combined weight of (A) and (B).

2. The aqueous dispersion of claim 1 wherein said sulfomonomer is sodiosulfoisophthalic acid.

3. The aqueous dispersion of claim 1 wherein said dicarboxylic acid comprises isophthalic acid.

4. The aqueous dispersion of claim 1 wherein said glycol comprises a poly(ethylene glycol).

5. An aqueous dispersion of claim 1 wherein said polyester has repeat units from isophthalic acid, sodiosulfoisophthalic acid, diethylene glycol and another glycol selected from at least one of ethylene glycol and 1,4-cyclohexanedimethanol, and another polymer containing at least 50 weight percent repeat units from vinyl acetate.

6. The aqueous dispersion of claim 1 wherein said aqueous dispersion has a total solids content of about 30% to 65%.

7. The aqueous dispersion of claim 1 wherein said polymer (B) comprises repeating units from 0 to about 50 weight % of one or more comonomers selected from the group consisting of ethylene, acrylic acid, methacrylic acid, acrylic and methacrylic acid esters, acrylamides, unsaturated dicarboxylic acid diesters, vinyl chloride and maleic anhydride.

8. The dispersion of claim 1 wherein said polymer (B) comprises repeating units from 0 to about 50 weight % of one or more comonomers selected from ethylene, acrylic acid ester and unsaturated dicarboxylic acid diesters.

9. The method of preparing an aqueous polymer dispersion which comprises
    (I) forming an aqueous dispersion having
        (1) about 5% to about 35% of a polyester having an I.V. of at least 0.1 and consisting essentially of repeat units from
            (a) at least one aromatic, saturated aliphatic or saturated alicyclic dicarboxylic acid,
            (b) from about 4 to about 25 mol %, based on the total of all acid and hydroxyl monomers being equal to 200 mol %, of at least one difunctional sulfomonomer containing at least one metal sulfonate-group attached to an aromatic nucleous wherein the functional groups are hydroxyl or carboxyl, and
            (c) at least one glycol, and
        (2) at least one vinyl monomer of which about 50 to 100 weight % is vinyl acetate,
    (II) polymerizing said vinyl monomers in said aqueous dispersion,
    to thereby obtain an aqueous dispersion of a blend of polymers with a total solids content of up to about 65%.

10. The method of claim 9 wherein said sulfomonomer is sodiosulfoisophthalic acid.

11. The method of claim 9 wherein said dicarboxylic acid comprises isophthalic acid.

12. The method of claim 9 wherein said glycol comprises a poly(ethylene glycol).

13. A method of claim 9 wherein said polyester has repeat units from isophthalic acid, sodiosulfoisophthalic acid, diethylene glycol and another glycol selected from at least one of ethylene glycol and 1,4-cyclohexanedimethanol, and another polymer containing at least 50 weight percent repeat units from vinyl acetate.

14. The method of claim 9 wherein said polymer (B) comprises repeating units from 0 to about 50 weight % of one or more comonomers selected from the group consisting of ethylene, acrylic acid, methacrylic acid, acrylic and methacrylic acid esters, acrylamides, unsaturated dicarboxylic acid diesters, vinyl chloride and maleic anhydride.

15. The method of claim 9 wherein said polymer comprises repeating units from 0 to about 50 weight % of one or more comonomers selected from ethylene, acrylic acid esters and unsaturated dicarboxylic acid diesters.

16. A substrate having a coating comprising the solids residue from the dispersion of claim 1.

* * * * *